US011578983B2

(12) United States Patent
Miyagawa et al.

(10) Patent No.: US 11,578,983 B2
(45) Date of Patent: Feb. 14, 2023

(54) ROUTE SEARCH SYSTEM, ROUTE SEARCH APPARATUS, ROUTE SEARCH METHOD, AND COMPUTER PROGRAM

(71) Applicant: SUMITOMO ELECTRIC INDUSTRIES, LTD., Osaka (JP)

(72) Inventors: Yuta Miyagawa, Osaka (JP); Yasuhiko Nishi, Osaka (JP); Koichi Takayama, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 285 days.

(21) Appl. No.: 16/467,187

(22) PCT Filed: Sep. 22, 2017

(86) PCT No.: PCT/JP2017/034300
§ 371 (c)(1),
(2) Date: Jun. 6, 2019

(87) PCT Pub. No.: WO2018/110023
PCT Pub. Date: Jun. 21, 2018

(65) Prior Publication Data
US 2019/0316920 A1 Oct. 17, 2019

(30) Foreign Application Priority Data
Dec. 13, 2016 (JP) .............................. JP2016-240985

(51) Int. Cl.
*G01C 21/00* (2006.01)
*G01C 21/34* (2006.01)
*G08G 1/123* (2006.01)
(52) U.S. Cl.
CPC ..... *G01C 21/3423* (2013.01); *G01C 21/3415* (2013.01); *G08G 1/123* (2013.01)

(58) Field of Classification Search
CPC . G01C 21/3423; G01C 21/3415; G08G 1/123
See application file for complete search history.

(56) References Cited

U.S. PATENT DOCUMENTS 6,208,934 B1 * 3/2001 Bechtolsheim .... G01C 21/3688
701/428
10,895,463 B1 * 1/2021 Cope .................. G01C 21/3484
(Continued)

FOREIGN PATENT DOCUMENTS

JP 2006-343343 A 12/2006
JP 2012-189438 A 10/2012
(Continued)

OTHER PUBLICATIONS

Akamatsu, Takashi, "Theory for Forecasting / Control of Dynamic Transporation Network Flows," Doboku Keikakugaku Kenkyu Ronbunshu No. 13, Aug. 1996, pp. 23-48, including partial English translation.

*Primary Examiner* — Truc M Do
(74) *Attorney, Agent, or Firm* — Faegre Drinker Biddle & Reath LLP

(57) ABSTRACT

The present disclosure relates to a route search system including a route search apparatus that communicates with a mobile terminal. The route search apparatus includes: a communication unit that receives, from the mobile terminal, a search request including identification information of a user, and transmits a search result corresponding to the search request to the mobile terminal of the user; and a control unit that executes a search process for a multimodal route that includes at least one of a pedestrian route, a non-public route, and a public route, in accordance with the received search request, and causes the communication unit to transmit the multimodal route as a search result. The control unit causes a passage schedule of the at least one route, and identification information, of traveling means (Continued)

used for traveling along the at least one route, which is associated with the identification information of the user, to be included in a data content of the multimodal route.

13 Claims, 8 Drawing Sheets

(56) References Cited

U.S. PATENT DOCUMENTS

2012/0004841 A1* 1/2012 Schunder ........... G01C 21/3661
                                                              701/412
2012/0310520 A1* 12/2012 Kanno ............... G01C 21/3423
                                                              701/400
2016/0356603 A1* 12/2016 Hajj ....................... G08G 1/123

FOREIGN PATENT DOCUMENTS

| JP | 2015-114124 A | 6/2015 |
| JP | 2016-177396 A | 10/2016 |
| WO | WO-03/015051 A1 | 2/2003 |

* cited by examiner

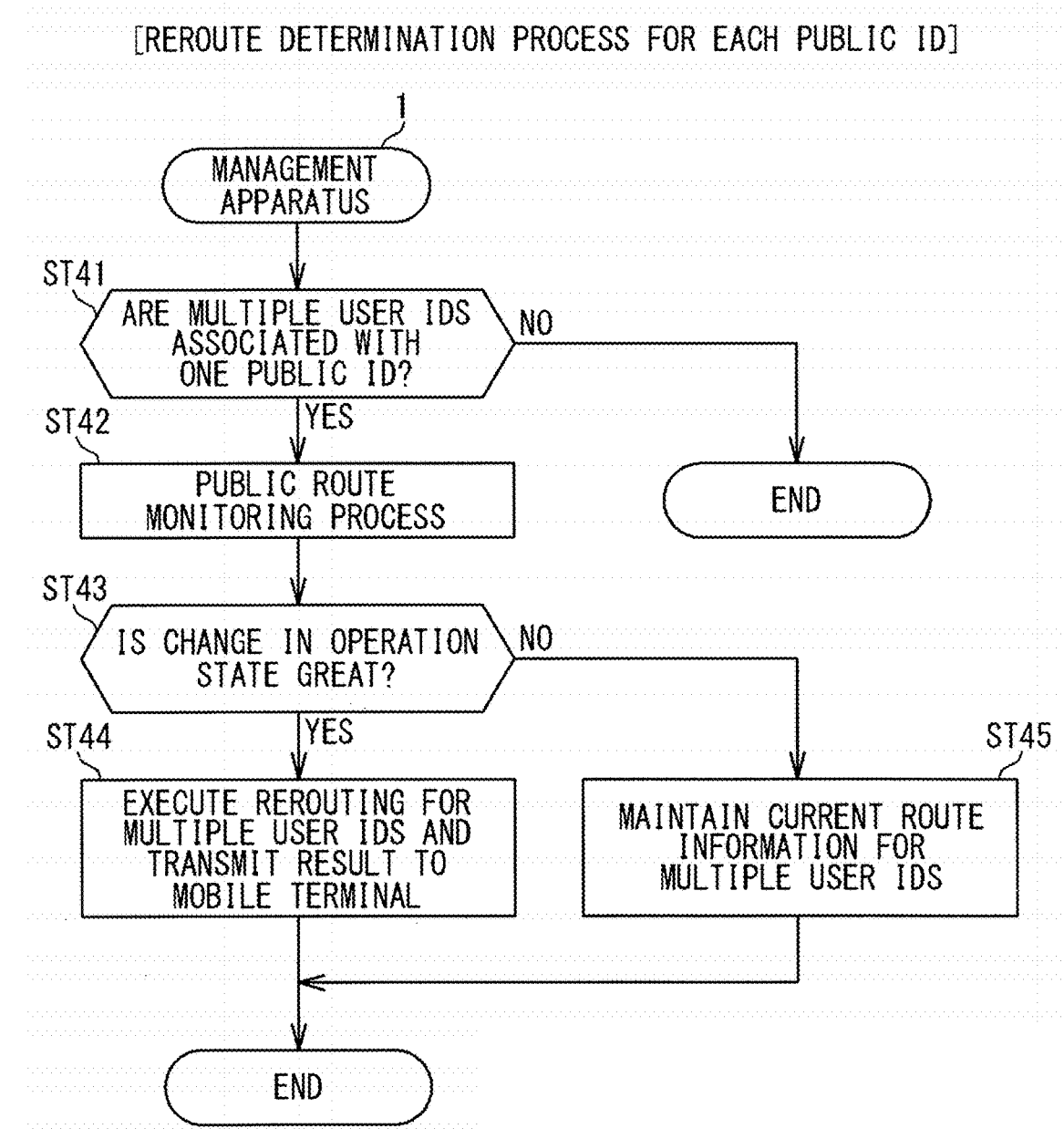

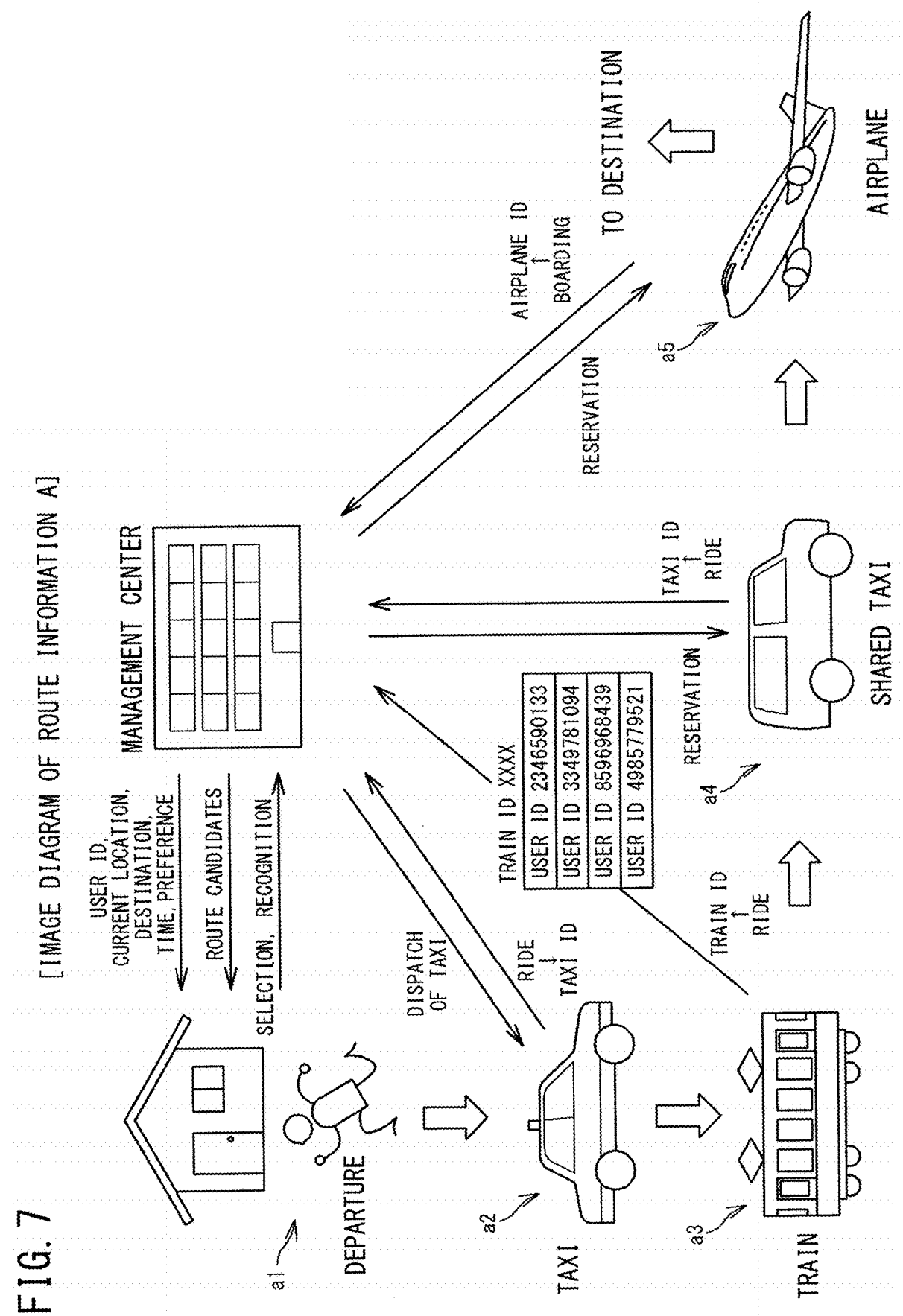

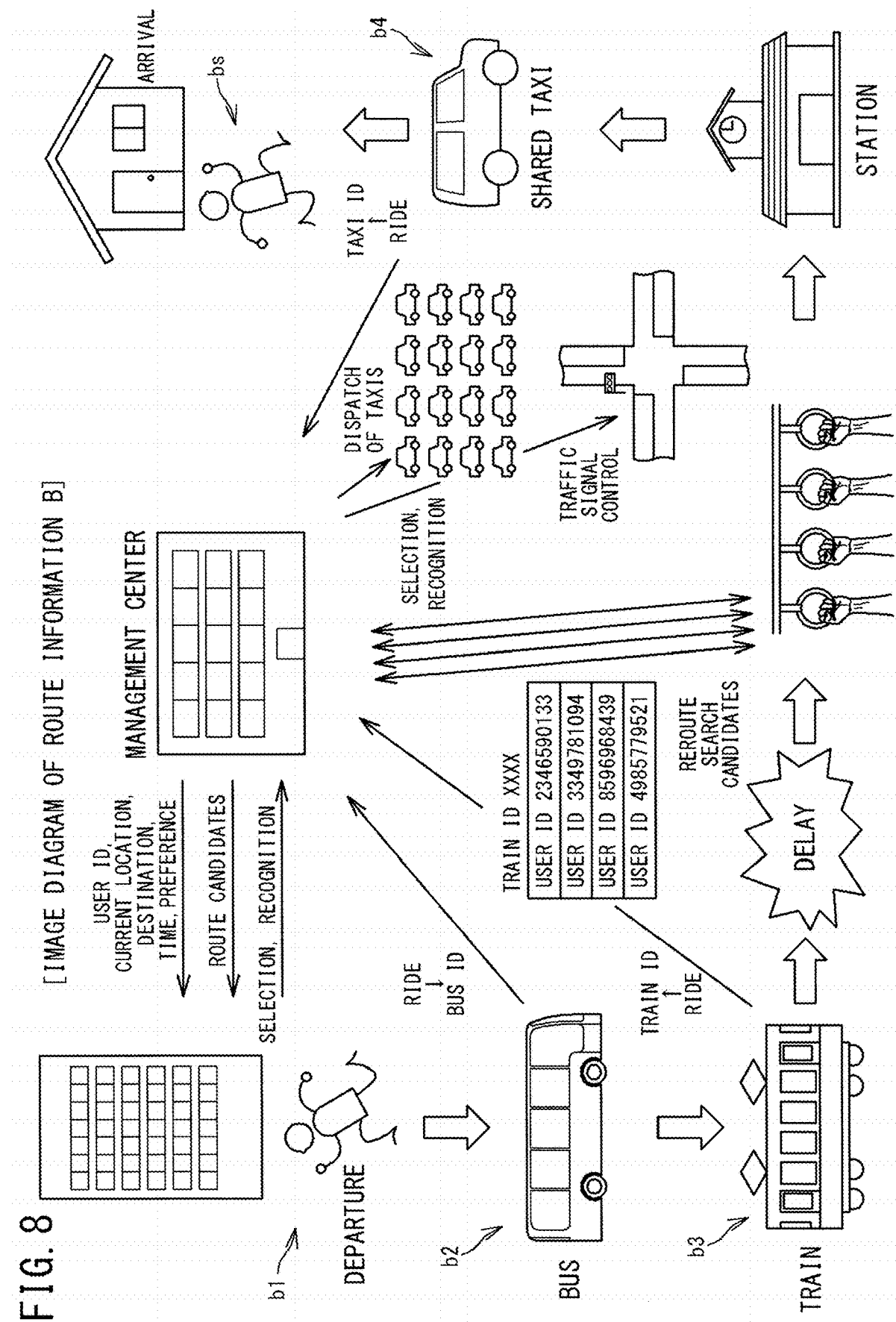

ROUTE SEARCH SYSTEM, ROUTE SEARCH APPARATUS, ROUTE SEARCH METHOD, AND COMPUTER PROGRAM

TECHNICAL FIELD

The present invention relates to a route search system, a route search apparatus, a route search method, and a computer program which provide a user with a multimodal route.

This application claims priority on Japanese Patent Application No. 2016-240985 filed on Dec. 13, 2016, the entire contents of which are incorporated herein by reference.

BACKGROUND ART

Patent Literature 1 discloses a route search system which provides a mobile terminal of a user with a multimodal route (scheduled traveling route) consisting of a plurality of routes using different traveling means.

CITATION LIST

Patent Literature

PATENT LITERATURE 1: Japanese Laid-Open Patent Publication No. 2016-177396

SUMMARY OF INVENTION

Technical Problem (1) A route search system according to one embodiment of the present disclosure is a route search system including a route search apparatus configured to communicate with a mobile terminal. The route search apparatus includes: a communication unit configured to receive, from the mobile terminal, a search request including identification information of a user, and transmit a search result corresponding to the search request to the mobile terminal of the user; and a control unit configured to execute a search process for a multimodal route that includes at least one of the following routes, in accordance with the received search request, and cause the communication unit to transmit the multimodal route as a search result. The control unit causes a passage schedule of the at least one route, and identification information, of traveling means used for traveling along the at least one route, which is associated with the identification information of the user, to be included in a data content of the multimodal route.

Pedestrian route: a route in which the user travels on foot

Non-public route: a route in which the user travels by using a non-public vehicle Public route: a route in which the user travels by using public transportation

(11) A route search apparatus according to one embodiment of the present disclosure is a route search apparatus configured to communicate with a mobile terminal. The route search apparatus includes: a communication unit configured to receive, from the mobile terminal, a search request including identification information of a user, and transmit a search result corresponding to the search request to the mobile terminal of the user; and a control unit configured to execute a search process for a multimodal route that includes at least one of the above routes, in accordance with the received search request, and cause the communication unit to transmit the multimodal route as a search result. The control unit causes a passage schedule of the at least one route, and identification information, of traveling means used for traveling along the at least one route, which is associated with the identification information of the user, to be included in a data content of the multimodal route.

(12) A route search method according to one embodiment of the present disclosure is a route search method executed by a route search apparatus configured to communicate with a mobile terminal. The method includes the steps of: receiving, from the mobile terminal, a search request including identification information of a user; executing a search process for a multimodal route that includes at least one of the above routes, in accordance with the received search request, and transmitting the multimodal route as a search result to the mobile terminal of the user; and causing a passage schedule of the at least one route, and identification information, of traveling means for passage of the at least one route, which is the identification information of the user associated with identification information of the mobile terminal, to be included in a data content of the multimodal route.

(13) A computer program according to one embodiment of the present disclosure is a computer program for causing a computer to function as a route search apparatus configured to communicate with a mobile terminal. The program causes the computer to function as: a communication unit configured to receive, from the mobile terminal, a search request including identification information of a user, and transmit a search result corresponding to the search request to the mobile terminal of the user; and a control unit configured to execute a search process for a multimodal route that includes at least one of the above routes, in accordance with the received search request, and cause the communication unit to transmit the multimodal route as a search result. The control unit causes a passage schedule of the at least one route, and identification information, of traveling means for passage of the at least one route, which is associated with the identification information of the user, to be included in a data content of the multimodal route.

BRIEF DESCRIPTION OF DRAWINGS

FIG. 6 is a flowchart showing an example of a reroute determination process for each public ID.

FIG. 7 is an image diagram showing routes included in route information A.

FIG. 8 is an image diagram showing routes included in another route information B.

DESCRIPTION OF EMBODIMENTS

Figure 1:
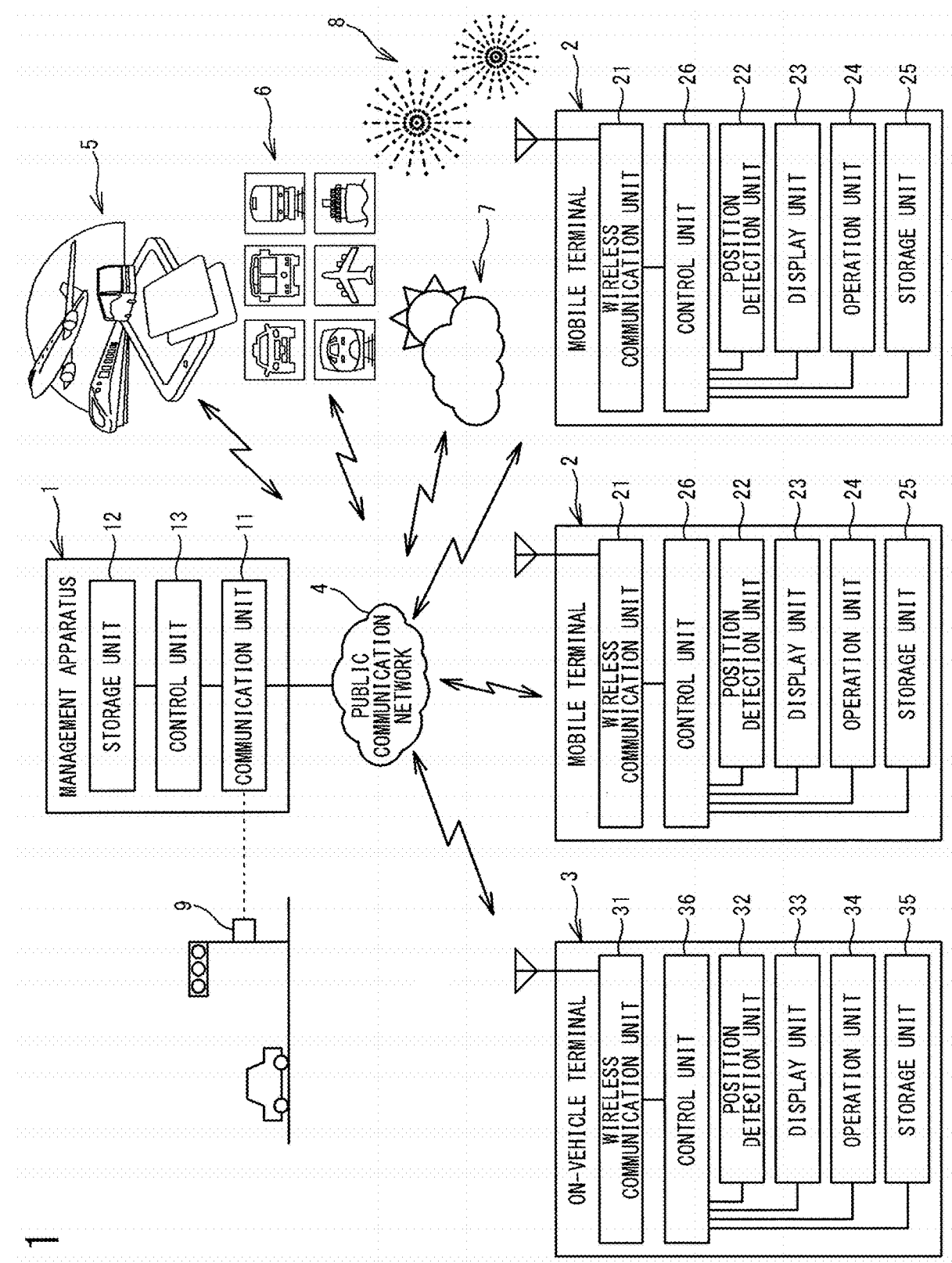
FIG. 1 shows an overall configuration of a route search system according to an embodiment of the present disclosure.

In the route search system disclosed in Patent Literature 1, a route search apparatus, which is implemented as a server computer, monitors whether or not a mobile terminal can pass a scheduled traveling route as scheduled. If an event that hinders the mobile terminal from passing as scheduled occurs, the route search apparatus calculates a new scheduled traveling route under a search condition that is specified first, and then transmits the new scheduled traveling route to the mobile terminal.

<Problem to Be Solved By the Present Disclosure>

In the conventional route search system, the route search apparatus collectively executes a monitoring process as to whether or not the mobile terminal can pass the scheduled traveling route as scheduled. Therefore, the larger the number of scheduled traveling routes (the number of users) to be monitored is, the greater the processing load required for the monitoring process for the scheduled traveling routes.

In view of the conventional problems, an object of the present disclosure is to provide a route search system and the like capable of appropriately dispersing processing load for the multimodal route monitoring process.

<Effect of Present Disclosure>

According to the present disclosure, processing load for the multimodal route monitoring process can be appropriately dispersed.

<Outline of Embodiment of Present Disclosure>

Hereinafter, the outline of an embodiment of the present disclosure is listed and described.

(1) A route search system according to the present embodiment is a route search system including a route search apparatus configured to communicate with a mobile terminal. The route search apparatus includes: a communication unit configured to receive, from the mobile terminal, a search request including identification information of a user, and transmit a search result corresponding to the search request to the mobile terminal of the user; and a control unit configured to execute a search process for a multimodal route that includes at least one of the following routes, in accordance with the received search request, and cause the communication unit to transmit the multimodal route as a search result.

Further, the control unit causes a passage schedule of the at least one route, and identification information, of traveling means used for traveling along the at least one route, which is associated with the identification information of the user, to be included in a data content of the multimodal route.

Pedestrian route: a route in which the user travels on foot

Non-public route: a route in which the user travels by using a non-public vehicle Public route: a route in which the user travels by using public transportation According to the route search system of the present embodiment, the control unit causes the passage schedule of the at least one route, and the identification information, of the traveling means used for traveling along the at least one route, which is associated with the identification information of the user, to be included in the data content of the multimodal route.

Therefore, it is possible to cause a local terminal such as a mobile terminal to execute the process of monitoring as to whether or not the user is traveling each route as scheduled, whereby processing load for the multimodal route monitoring process can be appropriately dispersed. Thus, processing load of the route search apparatus can be reduced.

(2) In the route search system of the present embodiment, the mobile terminal may monitor whether or not the mobile terminal is traveling the pedestrian route as scheduled, on the basis of the passage schedule of the pedestrian route.

The reason is as follows. Since the communication terminal, which communicates with the route search apparatus in the pedestrian route, is only the mobile terminal, it is preferable to cause the mobile terminal to execute the pedestrian route monitoring process.

(3) In the route search system of the present embodiment, when the result of the monitoring is negative, the mobile terminal preferably transmits, to the route search apparatus, a reroute request that causes the route search apparatus to re-execute the search process.

In this case, even when the user could not travel the pedestrian route as scheduled, the mobile terminal can receive an alternative multimodal route newly generated by the route search apparatus, whereby the user is provided with effective route information for the future.

(4) The route search system of the present embodiment further includes an on-vehicle terminal mounted on the non-public vehicle. In a case where the on-vehicle terminal has previously been notified of a passage schedule of the non-public route in which the non-public vehicle passes, and identification information of the non-public vehicle, the on-vehicle terminal may monitor whether or not the non-public vehicle is traveling the non-public route as scheduled, on the basis of the passage schedule of the non-public route.

The reason is as follows. When the on-vehicle terminal executes the non-public route monitoring process, the mobile terminal need not execute the monitoring process, whereby reduction in the remaining charge amount of the mobile terminal can be inhibited.

(5) In the route search system of the present embodiment, when the result of the monitoring is negative, the on-vehicle terminal preferably transmits, to the route search apparatus, a reroute request that causes the route search apparatus to re-execute the search process.

In this case, even when the user could not travel the non-public route as scheduled, the mobile terminal can receive an alternative multimodal route newly generated by the route search apparatus, whereby the user is provided with effective route information for the future.

(6) In the route search system of the present embodiment, the control unit preferably monitors whether or not the public transportation is traveling the public route as scheduled, on the basis of the passage schedule of the public route.

The reason is as follows. Since a plurality of users may board the public transportation, monitoring one public route is enough to determine the necessity of rerouting for the plurality of users who use the public route.

(7) Therefore, when the result of the monitoring is negative, the control unit preferably re-executes the search process with respect to identification information of all the mobile terminals corresponding to identification information of the public transportation.

(8) In the route search system of the present embodiment, the route search apparatus executes monitoring as to whether or not the user is traveling the public route as scheduled, and the mobile terminal or an on-vehicle terminal of the non-public vehicle executes monitoring as to whether or not the user is traveling the routes other than the public route as scheduled.

Thus, monitoring of the routes included in the multimodal route can be appropriately shared by a plurality of subjects.

(9) In the route search system of the present embodiment, when the communication unit has received a reroute request from the mobile terminal or the on-vehicle terminal, the control unit preferably executes rerouting that is a process of re-executing the search process with respect to the identification information of the user included in the reroute request or to the identification information of the user corresponding to the identification information of the traveling means.

Thus, even in a case where an event, which hinders the user from traveling as scheduled, occurs in the pedestrian route or the non-public route in which the route search apparatus is not a monitor subject, the route search apparatus can execute rerouting.

(10) In the route search system of the present embodiment, in a case where there is no reroute request from the on-vehicle terminal and there is no completion notification regarding the non-public route from the on-vehicle terminal even when an end-point passing time of the non-public route has passed, the control unit preferably transmits, to the mobile terminal, a confirmation request as to whether or not the on-vehicle terminal has traveled the non-public route as scheduled.

In this case, even in a case where the on-vehicle terminal cannot communicate with the route search apparatus due to temporary communication failure or the like, the mobile terminal can be caused to execute the monitoring process as to whether or not the user has traveled the non-public route as scheduled.

(11) A route search apparatus of the present embodiment relates to a route search apparatus constituting the route search system according to any one of the above (1) to (10).

Therefore, the route search apparatus of the present embodiment exhibits the same effects as those of the route search system according to any one of the above (1) to (10).

(12) A route search method of the present embodiment relates to a route search method executed by a route search apparatus constituting the route search system according to any one of the above (1) to (10).

Therefore, the route search apparatus of the present embodiment exhibits the same effects as those of the route search system according to any one of the above (1) to (10).

(13) A computer program of the present embodiment relates to a computer program for causing a computer to function as a route search apparatus constituting the route search system according to any one of the above (1) to (10).

Therefore, the computer program of the present embodiment exhibits the same effects as those of the route search system according to any one of the above (1) to (10).

<Details of Embodiment of the Present Disclosure>

Hereinafter, embodiments of the present disclosure will be described with reference to the drawings. At least some parts of the embodiments descried below may be combined together as desired.

[Overall Configuration of Route Search System]

FIG. 1 shows an overall configuration of a route search system according to an embodiment of the present disclosure.

As shown in FIG. 1, the route search system of the present embodiment includes: a management apparatus (route search apparatus) 1 having a route search function and placed in a traffic control center or the like; a plurality of mobile terminals 2; and a plurality of on-vehicle terminals 3. The management apparatus 1 is communicable with the mobile terminals 2 and the on-vehicle terminals 3 via a public communication network 4 such as the Internet.

The management apparatus 1 of the present embodiment stores therein user IDs of the mobile terminals 2 owned by registered members (users) in advance. As for a user ID, a physical address such as a MAC address unique to hardware may be used, or an identification value originally defined by the management apparatus 1 may be used. For example, upon receiving an application of registration for system utilization from a user, the management apparatus 1 can assign a specific ID to the user and store the ID.

The management apparatus 1 is able to execute a route information providing service in which, in response to a search request received from a mobile terminal 2, the management apparatus 1 searches for an optimum route obtained by combining a plurality of traveling means, such as a vehicle owned by the user, public transportation, etc., for the user ID corresponding to the mobile terminal 2, and returns the search result to the mobile terminal 2.

In this specification, a "vehicle" indicates an automobile, a motor-assisted bicycle, a light vehicle, a trolley bus, etc. A "public vehicle" indicates a highly public vehicle assumed to accommodate a plurality of passengers, such as a fixed-route bus, a train, etc. "Public transportation" indicates, in addition to the public vehicle, highly public traveling means other than vehicles, such as an airplane, a passenger ship, etc.

A "non-public vehicle" indicates: a non-public vehicle such as a vehicle owned by a user (hereinafter referred to as "own vehicle"); and a less public vehicle whose destination can be specified by an occupant of the vehicle, such as a taxi, a rental car, a shared taxi, etc. A vehicle, which is owned by a person other than a user and is allowed by the owner to be used by a third person, is a type of non-public vehicle.

The mobile terminal 2 is a terminal device that is carried by a user and is communicable with the management apparatus 1. The mobile terminal 2 is implemented as, for example, a smartphone, a tablet terminal, a notebook PC, etc., in which an application for utilizing the search result received from the management apparatus 1 is installed.

The on-vehicle terminal 3 is a terminal device that is mounted on a non-public vehicle communicable with the management apparatus 1. The on-vehicle terminal 3 is implemented as, for example, a car navigation device in which an application for utilizing the search result received from the management apparatus 1 is installed.

The management apparatus 1 is communicable with a reservation management server 5 of transportation means via the public communication network 4. The management apparatus 1 can execute, through the reservation management server 5, a reservation for transportation means that a user uses (e.g., taxi dispatch reservation, electronic ticket arrangement, etc.).

The management apparatus 1 is communicable with an operation management server 6 of transportation means via the public communication network 4. The management apparatus 1 can acquire current operation schedules of transportation means such as a taxi and public transportation through communication with the operation management server 6.

The management apparatus 1 is communicable with a weather server 7 providing weather information, via the public communication network 4. The management apparatus 1 can acquire information about current and future weather in a predetermined area, through communication with the weather server 7.

The management apparatus 1 is communicable with an event server 8 providing event information, via the public communication network 4. The management apparatus 1 can acquire information about current and future events held in a predetermined area, through communication with the event server 8.

The management apparatus 1 can acquire, from a road traffic information center (not shown), VICS (registered trademark) information distributed by FM multiplex broadcasting.

The management apparatus 1 is communicably connected to traffic signal controllers 9 included in a predetermined management area via dedicated communication lines such as telephone lines. As for traffic signal units provided at intersections that belong to the management area, the management apparatus 1 is able to execute, for example, traffic-actuated control for changing signal control parameters (a split, a cycle length, an offset, etc.) according to traffic situation.

[Internal Configuration of Management Apparatus]

The management apparatus 1 is implemented as a server computer. As shown in FIG. 1, the management apparatus 1 includes a communication unit 11, a storage unit 12, and a control unit 13.

The communication unit 11 is implemented as a communication device that includes an amplification circuit, a frequency conversion circuit, modulation and demodulation circuits, etc., and that is required for wired communication with the public communication network 4. The communication unit 11 is also compatible to communication with the traffic signal controllers 9 via the dedicated communication lines.

The storage unit 12 is implemented as a magnetic storage medium or a nonvolatile storage medium such as a flash memory. The control unit 13 is implemented as a microcomputer including a CPU, a RAM, a ROM, a flash memory, etc.

The control unit 13 realizes various types of processes and functions when the CPU reads out a computer program stored in the storage unit 12 and executes the program. Examples of the processes executed by the control unit 13 include: a process of searching for a multimodal route, and a process of arranging a taxi or public transportation.

The storage unit 12 includes a traffic information database, a map database, an operation database, etc. The traffic information database contains, for each of road links, information of a congestion degree of the road link at present.

Based on the VICS information or the like received from the road traffic information center, the control unit 13 successively updates traffic information (e.g., traffic congestion information) stored in the traffic information database.

The map database contains road data and facility data. The road data contains data relating to road configuration, such as position information and type information of links, position information and type information of nodes, and connection relation between the nodes and the links.

The facility data contains facility information of each facility. The facility information contains data such as the name of the facility, positional information, the parcel number of the land where the facility is located, and the type of the facility. Examples of the facility type include: a public office, a park, a school, a parking area, a convenience store, a restaurant, and a boarding/alighting place for public transportation (e.g., a station, a bus stop, an airport, or a dock).

The operation database contains operation schedules indicating stationary operation states of public transportation (e.g., a train, a bus, an airplane, a ship, etc.). Each operation schedule contains, for each of routes of public transportation, data of the name of the route, and data of arrival time and departure time, at the boarding/alighting place, of each service (flight) operated in the route.

The control unit 13 accesses the operation management server 6 every predetermined time (e.g., 1 minute), and successively updates a change, a delay time, or the like of the operation schedule.

The multimodal route search process is a process of calculating at least one candidate of an optimum multimodal route for the user, by using various types of data stored in the databases included in the storage unit 12.

A multimodal route is a route that allows a combination of a plurality of routes with different traveling means to be used. In the present embodiment, the following routes can be components of a multimodal route.

1) Pedestrian route: a route in which the user travels on foot. In the pedestrian route, the user may travel by using traveling means, such as a bicycle, having no on-vehicle terminal 3.

2) Non-public route: a route in which the user travels by using a non-public vehicle (e.g., an own vehicle, a taxi, a rental car, a shared taxi, etc.).

3) Public route: a route in which the user travels by using public transportation such as a public vehicle (e.g., a fixed-route bus, a train, an airplane, a passenger ship, etc.).

The multimodal route search process adopts an algorithm in which, for example, road links (constitutional units of a pedestrian route or a non-public route) contained in the map database and routes (constitutional units of a public route) contained in the operation database are used as constitutional links, and the costs of a plurality of candidate routes are compared by using, for example, the Dijkstra method to adopt a route with the lowest predetermined cost as an optimum route.

As for the predetermined cost, any one of the length of a section (traveling distance), a required time, and a fare (a fare for passing the section, e.g., a railroad fare) can be adopted. A predetermined parameter calculated based on these three amounts (e.g., $k1 \times length + k2 \times required\ time + k3 \times fare$, where $k1$ to $k3$ are weights) may be adopted as the cost.

The optimum route calculated through the search process may be a route consisting of non-public routes only, or a route including a pedestrian route, a non-public route, and a public route.

[Internal Configuration of Mobile Terminal]

As shown in FIG. 1, the mobile terminal 2 includes a wireless communication unit 21, a position detection unit 22, a display unit 23, an operation unit 24, a storage unit 25, and a control unit 26.

The wireless communication unit 21 is implemented as a wireless communication device that includes an amplification circuit, a frequency conversion circuit, modulation and demodulation circuits, etc., and that is required for wireless communication with a base station (not shown) connected to the public communication network 4.

The position detection unit 22 is a device that specifies the current position of the mobile terminal 2 and outputs the current position to the control unit 26. The position detection unit 22 is implemented as a GPS receiver, for example.

The display unit 23 is implemented as a display that displays texts, images, etc., for the user. The operation unit 24 is implemented as an input device that receives an operation input performed by the user (e.g., an operation input such as setting of a destination), and outputs a signal according to the received operation to the control unit 26.

The storage unit 25 is implemented as a magnetic storage medium or a nonvolatile storage medium such as a flash memory. The control unit 26 is implemented as a microcomputer having a CPU, a RAM, a ROM, a flash memory, etc.

The control unit 26 realizes various types of processes and functions when the CPU reads out a computer program stored in the storage unit 25 and executes the program. Examples of the processes executed by the control unit 13 include: a process of transmitting a search request and a reroute request; and a process of monitoring a pedestrian route.

[Internal Configuration of On-Vehicle Terminal]

As shown in FIG. 1, the on-vehicle terminal 3 includes a wireless communication unit 31, a position detection unit 32, a display unit 33, an operation unit 34, a storage unit 35, and a control unit 36.

The wireless communication unit 31 is implemented as a wireless communication device that includes an amplification circuit, a frequency conversion circuit, modulation and demodulation circuits, etc., and that is required for wireless communication with a base station (not shown) connected to the public communication network 4.

The position detection unit 32 is a device that specifies the current position of the on-vehicle terminal 3 and outputs the current position to the control unit 36. The position detection unit 32 is implemented as a device obtained by combining a GPS receiver, a vehicle speed sensor, and a gyro sensor.

The display unit 33 is implemented as a display device which displays texts, images, etc., for the user. The operation unit 34 is implemented as an input device which receives an operation input performed by the user (e.g., an operation input such as setting of a destination), and outputs a signal according to the received operation to the control unit 36.

The storage unit 35 is implemented as a magnetic storage medium or a nonvolatile storage medium such as a flash memory. The control unit 36 is implemented as a microcomputer having a CPU, a RAM, a ROM, a flash memory, etc.

The control unit 36 realizes various types of processes and functions when the CPU reads out a computer program stored in the storage unit 35 and executes the program. Examples of the processes executed by the control unit 36 include: a process of transmitting a reroute request; and a process of monitoring a non-public route.

[Communication Sequence Before Departure]

Figure 2:
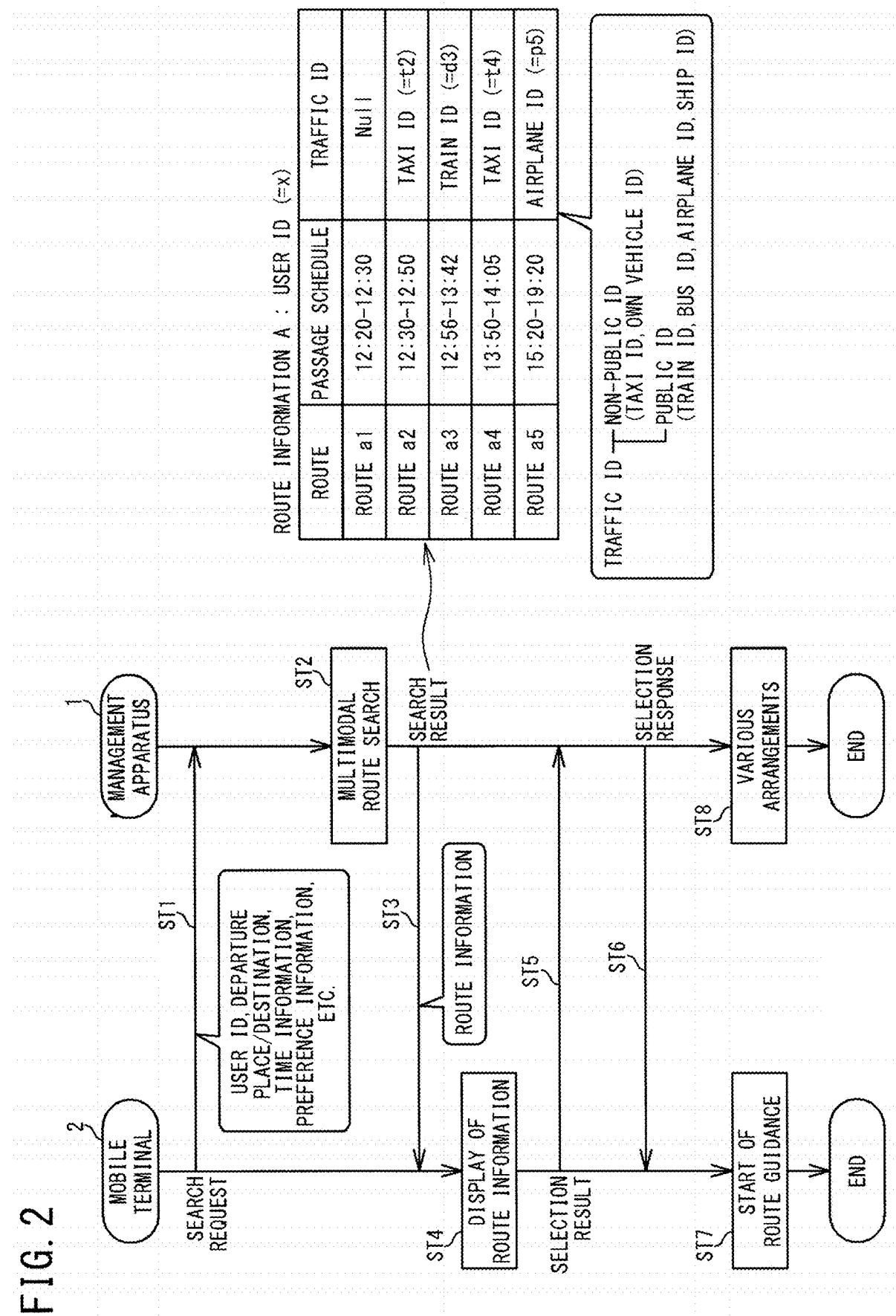
FIG. 2 is a sequence diagram showing an example of a communication procedure between a mobile terminal and a management apparatus.

FIG. 2 is a sequence diagram showing an example of a communication procedure between a mobile terminal and the management apparatus, which is performed before departure of a user.

Although the "management apparatus 1" and the "mobile terminal 2" are described as operation subjects below, the operation subjects that actually execute the processing are the control unit 13 of the management apparatus 1 and the control unit 26 of the mobile terminal 2.

As shown in FIG. 2, when the mobile terminal 2 of the user transmits a search request to the management apparatus 1, the management apparatus 1 receives the search request (step ST1).

The search request, which is the first request, includes a user ID, positional information (departure place and destination), time information (departure time and arrival time), etc. The search request may further include preference information of the user. The preference information includes information representing what the user is preferentially concerned about, such as travel hours, the number of times of transfer, fare, comfortability, and preferential use of his/her own vehicle or public transportation. The management apparatus 1 can set the cost of the search process in accordance with the preference information of the user.

Next, the management apparatus 1 executes the multimodal route search process by using, as input information, the positional information, the time information, and the preference information included in the search request (step ST2).

In this case, the management apparatus 1 generates, as a search result, at least one multimodal route, and transmits the generated multimodal route to the mobile terminal 2 (step ST3).

On the right side in FIG. 2, a data content of route information A is shown as one example of the multimodal route generated through the search process of the management apparatus 1.

As shown in FIG. 2, the route information A is associated with the value of the user ID (here, user ID=x) of the mobile terminal 2 that has transmitted the search request. The route information A includes a plurality of routes a1 to a5. Although not shown in FIG. 2, each of the routes a1 to a5 includes information that positionally specifies a start point and an end point of the route. Each of the routes a1 to a5 may include data such as road links, nodes, and service routes.

The route information A includes: passage schedules for timely passing scheduled passing points in the routes a1 to a5 (in the example of FIG. 2, a start point and an end point of each route); and identification information (hereinafter also referred to as "traffic ID") of traveling means used for traveling along the routes a1 to a5.

That is, the control unit 13 of the management apparatus 1 adds, as the data content of the route information A, the passage schedules of the routes a1 to a5, and the traffic IDs that are associated with the user ID (=x) and that are used for traveling along the routes a1 to a5.

In the example of FIG. 2, the passage schedules of the route a1 to a5 consist of start-point passing time points and end-point passing time points of the routes a1 to a5. Of course, scheduled passing times at intermediate points in the routes a1 to a5 (e.g., predetermined points such as intersections provided in the route a2) may be included.

The traffic IDs added by the control unit 13 of the management apparatus 1 are classified into non-public IDs and public IDs in the present embodiment. The non-public IDs include taxi IDs, own vehicle IDs, etc. The public IDs include train IDs, bus IDs, airplane IDs, ship IDs, etc. However, if IDs are unique to the respective traveling means, it is not necessary to classify the IDs into non-public IDs and public IDs through an ID assignment system. In this case, whether the respective traveling means are "non-public" or "public" and/or the types of the respective traveling means, may be discriminated by using information other than the IDs unique to the traveling means.

In the route information A shown in FIG. 2, as for the passage schedule of the route a1, the start-point passing time is 12:20, and the end-point passing time is 12:30.

The traffic ID of the route a1 is Null (none). In this case, since no traffic ID is defined, the route a1 is a pedestrian route.

As for the passage schedule of the route a2, the start-point passing time is 12:30, and the end-point passing time is 12:50.

The traffic ID of the route a2 is an identification value (=t2) of a predetermined taxi ID. In this case, since the traffic ID is the taxi ID, the route a2 is a non-public route.

As for the passage schedule (stationary operation schedule) of the route a3, the start-point passing time is 12:56, and the end-point passing time is 13:42.

The traffic ID of the route a3 is an identification value (=d3) of a predetermined train ID. In this case, since the traffic ID is the train ID, the route a3 is a public route.

As for the passage schedule of the route a4, the start-point passing time is 13:50, and the end-point passing time is 14:05.

The traffic ID of the route a4 is an identification value (=t4) of a predetermined taxi ID. In this case, since the traffic ID is the taxi ID, the route a4 is a non-public route.

As for the passage schedule (stationary operation schedule) of the route a5, the start-point passing time is 15:20, and the end-point passing time is 19:20.

The traffic ID of the route a5 is an identification value (=p5) of a predetermined airplane ID. In this case, since the traffic ID is the airplane ID, the route a5 is a public route.

As is obvious from the above description, the route information A shown in FIG. 2 consists of a combination of the following routes a1 to a5 in order from the departure place to the destination.

1) route a1 which is a pedestrian route
2) route a2 which is a non-public route using a taxi
3) route a3 which is a public route using a train
4) route a4 which is a non-public route using a taxi
5) route a5 which is a public route using an airplane The mobile terminal 2 displays, on the display unit 23 thereof, the route information that has been received from the management apparatus 1 and consists of at least one multimodal route (step ST4), and receives a route information selection input performed by the user.

When the user selects the route information with the operation unit 24, the mobile terminal 2 transmits the inputted selection result to the management apparatus 1 (step ST5). Upon receiving the selection result, the management apparatus 1 transmits a selection response to the mobile terminal 2 (step ST6).

Upon receiving the selection response, the mobile terminal 2 starts a route guidance based on the selected route information (here, the route information A shown in FIG. 2) (step ST7).

Specifically, the mobile terminal 2 causes the display unit 23 to display map information including the routes a1 to a5 included in the route information A. The route guidance may be accompanied with speech.

The management apparatus 1, which has transmitted the selection response, executes various arrangements which are necessary when the user uses the routes a1 to a5 constituting the route information A (step ST8).

Specifically, the management apparatus 1 transmits an order message to a reservation management server 5 of a taxi company so that a taxi is dispatched to the start point before the start-point passing time of the route a2.

This order message includes: the user ID (=x) of the route information A; the passage schedule of the route a2 (e.g., the start point, the end point, the start point departure time, and the end point arrival time); and the taxi ID (=t2) assigned to the route a2. The reservation management server 5 provides these pieces of information provided from the management apparatus 1, to an on-vehicle terminal 3 of the taxi to be dispatched. The order message may include, in addition to the above information, a vehicle traveling route from the start point to the end point of the route a2, and a traveling schedule. The vehicle traveling route and the traveling schedule may not be included in the order message, but may be set on the taxi side (the on-vehicle terminal 3 or the like).

The management apparatus 1 transmits an order message to a reservation management server 5 of a taxi company so that a taxi is dispatched to the start point before the start-point passing time of the route a4.

This order message includes: the user ID (=x) of the route information A; the passage schedule of the route a4; and the taxi ID (=t4) assigned to the route a4. The reservation management server 5 provides these pieces of information provided from the management apparatus 1, to an on-vehicle terminal 3 of the taxi to be dispatched. The order message may include, in addition to the above information, a vehicle traveling route from the start point to the end point of the route a4, and a traveling schedule. The vehicle traveling route and the traveling schedule may not be included in the order message, but may be set on the taxi side (the on-vehicle terminal 3 or the like).

The management apparatus 1 transmits a reservation message for a ticket of a flight that will depart at the start-point passing time of the route a5, to a reservation management server 5 of an airline capable of providing a flight that uses an airport located at the start point of the route a5.

When the traffic ID of the traveling means of the route a2 is the own vehicle ID, the management apparatus 1 transmits the user ID (=x) of the route information A, the passage schedule of the route a2, and the own vehicle ID assigned to the route a2, to the on-vehicle terminal 3 of the own vehicle. This same applies to the case of the route a4.

[Reroute Determination Process in Pedestrian Route]

Figure 3:
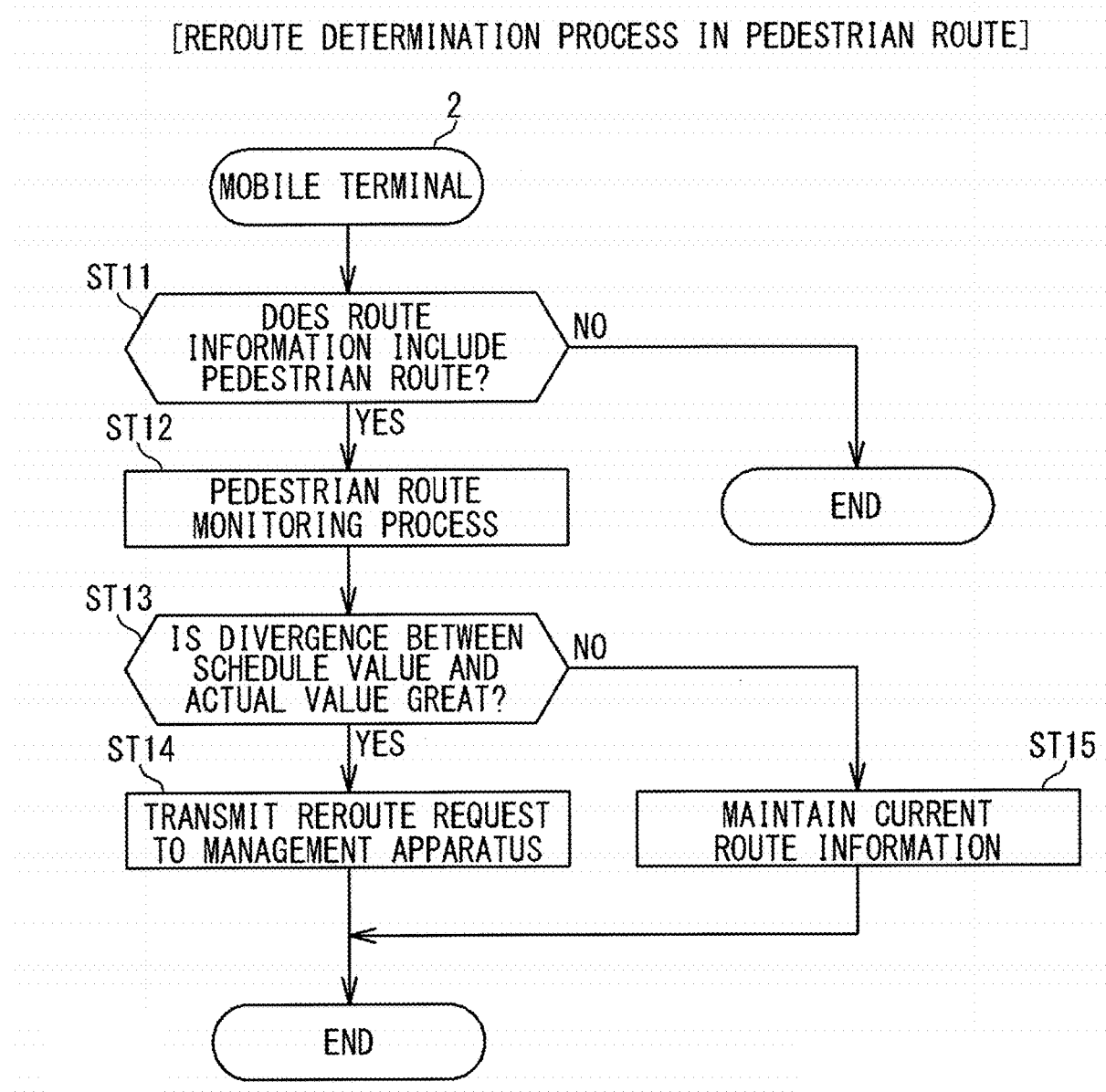
FIG. 3 is a flowchart showing an example of a reroute determination process in a pedestrian route.

FIG. 3 is a flowchart showing an example of a reroute determination process in a pedestrian route.

Although the "mobile terminal 2" is described as an operation subject below, the operation subject that actually executes the process is the control unit 26 of the mobile terminal 2. Here, the term "reroute" means re-execution of the multimodal route search process with respect to a mobile terminal 2, of a predetermined user ID (=x), which is traveling an already acquired multimodal route (this may be a first or second multimodal route).

As shown in FIG. 3, the mobile terminal 2 determines whether or not the route information A, which is currently held, includes the pedestrian route a1 (step ST11).

When the determination result is negative, the mobile terminal 2 ends the process. When the determination result is positive, the mobile terminal 2 executes a pedestrian route monitoring process (step ST12).

The "monitoring process" is a process of calculating and evaluating a divergence between a scheduled passing point and corresponding scheduled passing time (schedule value) and an actual passing point and passing time (actual value), on the basis of the passage schedule included in the route information A.

Accordingly, in the pedestrian route monitoring process, the mobile terminal 2 calculates a divergence between a scheduled passing point and scheduled passing time (schedule value) of the route a1 which is a pedestrian route, and an actual passing point and passing time (actual value). In addition, the mobile terminal 2 determines whether or not the calculated divergence between the schedule value and the actual value is great (step ST13).

For example, when the current time is 12:30 and the distance between the current position and the end point (scheduled passing point) of the route a1 is not smaller than a predetermined distance (e.g., 300 m), the mobile terminal 2 determines that the divergence between the schedule value and the actual value is great.

Likewise, when the current position is the end point (scheduled passing point) of the route a1 and a time difference between the current time and the scheduled passing time (=12:30) at the end point of the route a1 is not smaller than a predetermined time (e.g., 5 minutes), the mobile terminal 2 determines that the divergence between the schedule value and the actual value is great.

When the determination result is positive, since it is determined that the mobile terminal 2 is not traveling the pedestrian route as scheduled, the mobile terminal 2 transmits a reroute request to the management apparatus 1 (step ST14). The mobile terminal 2 causes the user ID (=x) and the current position of the mobile terminal 2 to be included in the reroute request. This current position is a departure position when the management apparatus 1 executes rerouting.

When the determination result is negative, the mobile terminal 2 does not transmit a reroute request to the management apparatus 1, and maintains the current route information A (step ST15).

[Reroute Determination Process in Non-Public Route]

Figure 4:
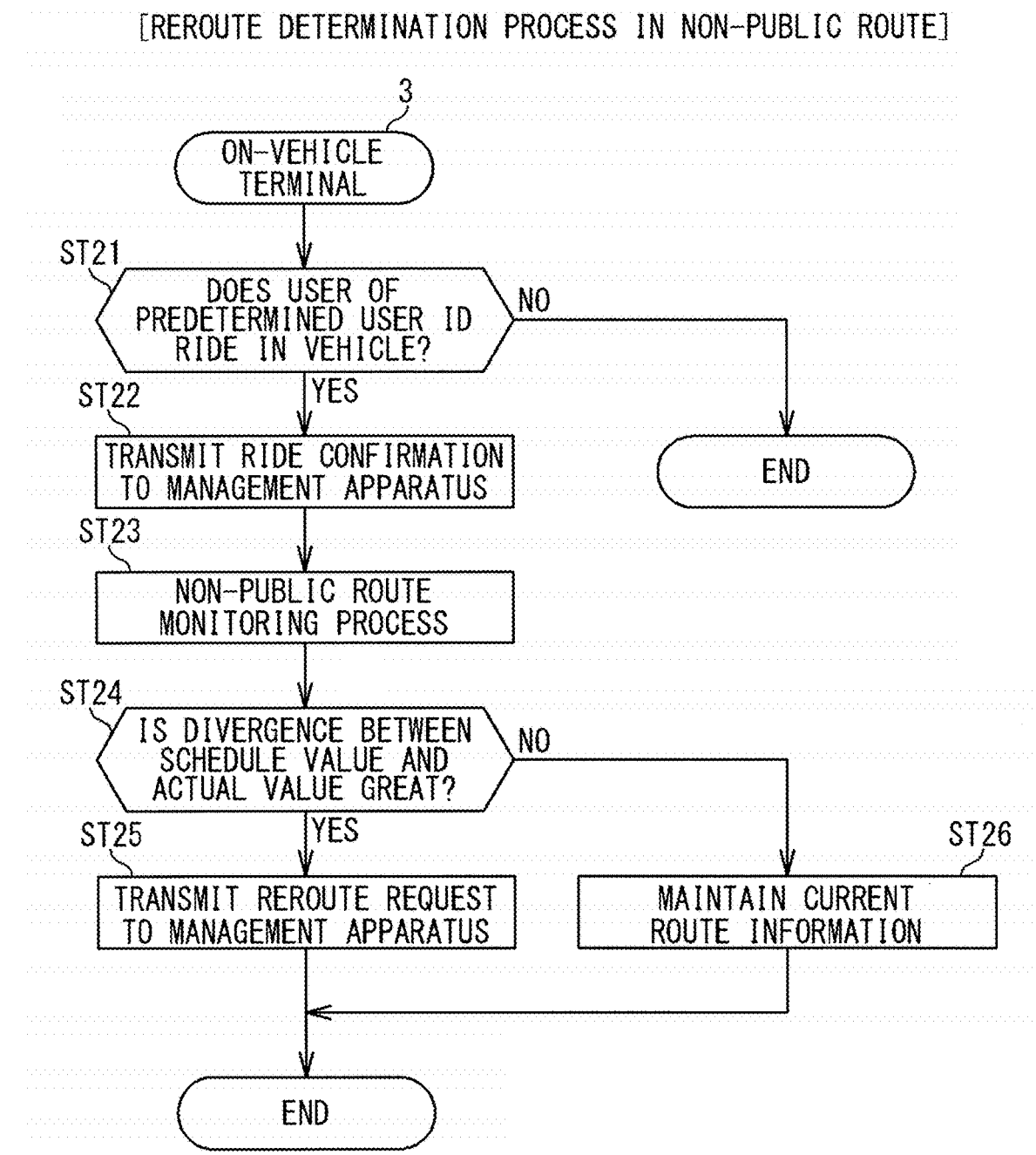
FIG. 4 is a flowchart showing an example of a reroute determination process in a non-public route.

FIG. 4 is a flowchart showing an example of a reroute determination process in a non-public route.

Although the "on-vehicle terminal 3" is described as an operation subject below, the operation subject that actually executes the process is the control unit 36 of the on-vehicle terminal 3.

When a vehicle traveling route and time are specified by the management apparatus 1, the on-vehicle terminal 3 causes the vehicle to travel by guiding the driver or by autonomous driving along the specified route and time. When the on-vehicle terminal 3 receives only the passage schedule from the management apparatus 1, the on-vehicle terminal 3 sets a vehicle traveling route and time by itself, and causes the vehicle to travel by guiding the driver or by autonomous driving along the set route and time.

In a case where the vehicle cannot arrive at the end point specified in the target route by the scheduled time due to a situation that unexpected traffic congestion occurs or driving of the driver deviates from the route, rerouting is performed. In a case where the vehicle cannot arrive at the specified start point by the scheduled time, this information is transmitted from the on-vehicle device 3 to the management apparatus 1 or the like, which enables the management apparatus 1, a mobile terminal 2, or the like to perform rerouting.

As shown in FIG. 4, the on-vehicle terminal 3 determines whether or not the user of the predetermined user ID (=x), which has been notified from the management apparatus 1, has gotten in the vehicle (step ST21).

This determination is performed based on, for example, whether or not there is an operation input for ride confirmation to the on-vehicle terminal 3 by the driver of the non-public vehicle. The driver of the non-public vehicle (e.g., a driver of a taxi) should perform an operation input for ride confirmation when the user ID (=x) notified from the management apparatus 1 coincides with the user ID presented by the mobile terminal 2 of the user.

In a case where the mobile terminal 2 and the on-vehicle terminal 3 can directly communicate with each other through WiFi communication or the like, the ride confirmation by checking the user ID may be performed through direct communication between the terminals 2 and 3.

When the determination result is negative, the on-vehicle terminal 3 ends the process. When the determination result is positive, the on-vehicle terminal 3 transmits the ride confirmation to the management apparatus 1 (step ST22), and thereafter executes a non-public route monitoring process (step ST23).

As described above, the "monitoring process" is a process of calculating and evaluating a divergence between a scheduled passing point and corresponding scheduled passing time (schedule value) and an actual passing point and passing time (actual value), on the basis of the passage schedule included in the route information A.

Accordingly, in the non-public route monitoring process, the on-vehicle terminal 3 calculates a divergence between a scheduled passing point and scheduled passing time (schedule value) of the route a2 (a4) which is a non-public route, and an actual passing point and passing time (actual value). In addition, the on-vehicle terminal 3 determines whether or not the calculated divergence between the schedule value and the actual value is great (step ST24).

For example, it is assumed that the route a2 includes: positional information of a predetermined intersection J2 that is an intermediate scheduled passing point; and scheduled passing time (=12:40) corresponding to the scheduled passing point.

In this case, the on-vehicle terminal 3 determines that the divergence between the schedule value and the actual value is great, when the current time is 12:40 and the distance between the current position and the position of the intersection J2 is not smaller than a predetermined distance (e.g., 1000 m).

Likewise, the mobile terminal 2 determines that the divergence between the schedule value and the actual value is great, when the current position is the position of the intersection J2 and a time difference between the current time and the scheduled passing time (=12:40) at the intersection J2 is not smaller than a predetermined time (e.g., 5 minutes).

When the determination result is positive, since it is determined that the on-vehicle terminal 3 is not traveling the non-public route as scheduled, the on-vehicle terminal 3 transmits a reroute request to the management apparatus 1 (step ST25). The on-vehicle terminal 3 causes the non-public ID (=t2 or t4) and the current position of the on-vehicle terminal 3 to be included in the reroute request. This current position is a departure position when the management apparatus 1 executes rerouting.

When the determination result is negative, the on-vehicle terminal 3 does not transmit a reroute request to the management apparatus 1, and maintains the current route information A (step ST26).

Even in a case where the determination result is positive and the vehicle cannot arrive at a certain scheduled passing point by the scheduled time, if it can be determined that the vehicle will finally arrive at the end point by the scheduled time, because of, for example, recovery of traffic situation ahead, or a change in traveling route setting by the on-vehicle terminal 3, the on-vehicle terminal 3 need not transmit a reroute request to the management apparatus 1.

A reroute request to the management apparatus 1 may be performed when it is determined that the vehicle cannot travel according to the passage schedule specified by the management apparatus 1.

[Confirmation of Boarding or the Like On Public Transportation]

[Confirmation of boarding or the like on public transportation]

In the route search system according to the present embodiment, traveling means of public transportation, such as a fixed-route bus, a train, and an airplane, are not provided with communication terminals communicable with the management apparatus 1.

Therefore, when a mobile terminal 2 has timely arrived at the start point of the route a3 (a5) that uses public transportation, the control unit 26 of the mobile terminal 2 preferably transmits, to the management apparatus 1, boarding confirmation including the user ID (=x) of the mobile terminal 2.

Thus, even when the traveling means of public transportation cannot communicate with the management apparatus 1, the management apparatus 1, which has received the boarding confirmation including the predetermined user ID (=x), can detect that the user having the mobile terminal 2 of the user ID has safely boarded the public transportation specified by the multimodal route.

As for a trigger with which the mobile terminal 2 transmits boarding (and/or alighting) confirmation, it is considered that at least one of the following conditions is satisfied, for example.

Condition 1: The current position of the mobile terminal 2 coincides with the start point of the passage schedule, and the current time of the mobile terminal 2 coincides with the start-point passing time of the passage schedule (determination of coincidence allows a predetermined room for error).

Condition 2: The operation unit 34 of the mobile terminal 2 has received an operation input for boarding/alighting confirmation performed by the user.

Condition 3: Passing of the mobile terminal 2 through a predetermined gate (e.g., a ticket barrier of a train station) has been detected.

[Reroute Determination Process for Each User ID By Management Apparatus]

Figure 5:
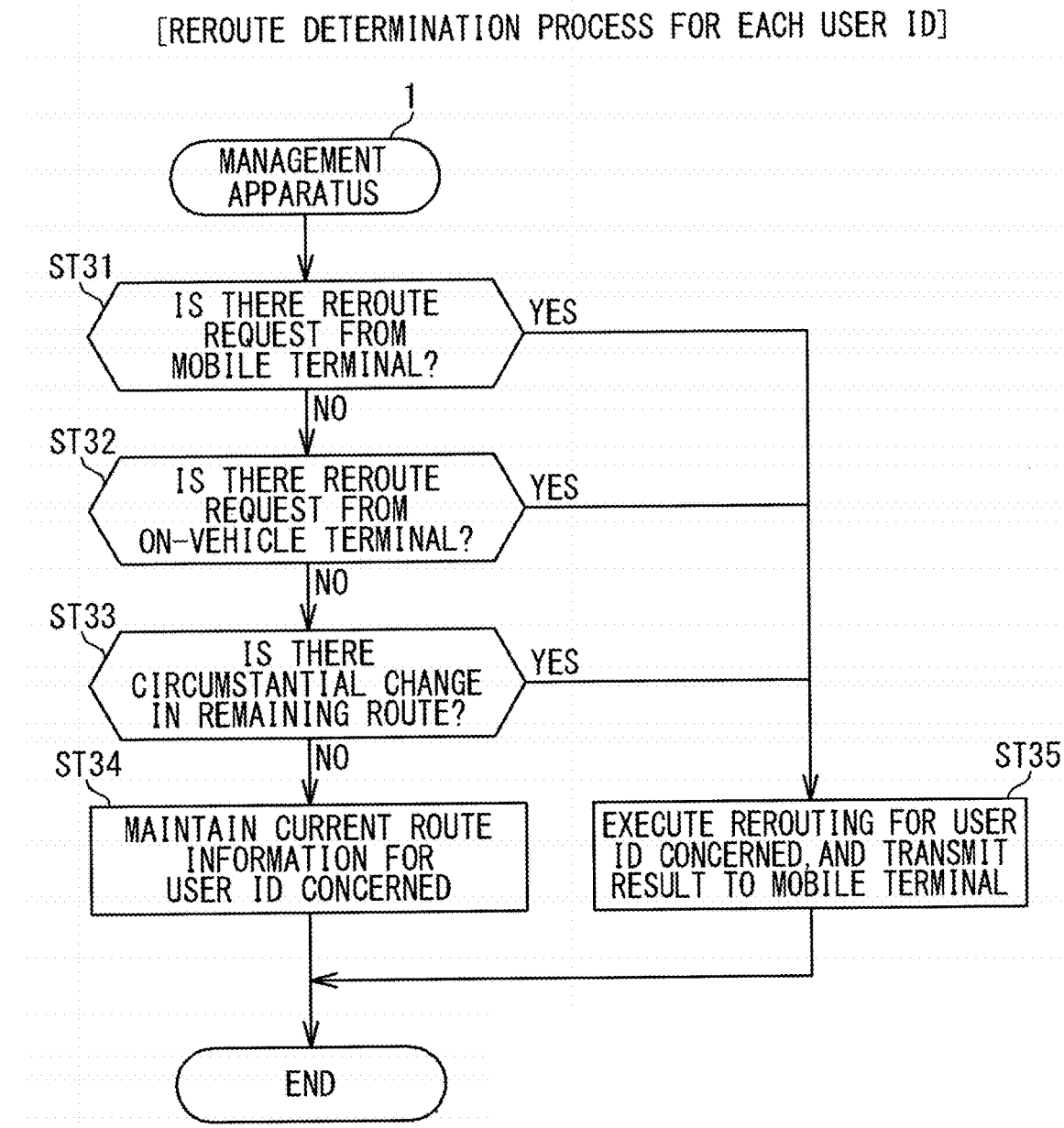
FIG. 5 is a flowchart showing an example of a reroute determination process for each user ID.

FIG. 5 is a flowchart showing an example of a reroute determination process for each user ID by the management apparatus 1.

Although the "management apparatus 1" is described as an operation subject below, the operation subject that actually executes the process is the control unit 13 of the management apparatus 1.

As shown in FIG. 5, the management apparatus 1 determines whether or not a reroute request has been received from a mobile terminal 2 of a predetermined user ID (=x) (step ST31).

When the determination result in step S31 is positive, the management apparatus 1 executes rerouting for the user ID (=x), and transmits the search result to the mobile terminal 2 of the same user ID (=x) (step ST35). The rerouting in this case is a multimodal route search process that is performed with the current position, of the mobile terminal 2, included in the reroute request being a departure position.

When the determination result in step S31 is negative, the management apparatus 1 further determines whether or not a reroute request has been received from an on-vehicle terminal 3 of a non-public ID (=t2 or t4) corresponding to the predetermined user ID (=x) (step ST32).

When the determination result in step S32 is positive, the management apparatus 1 executes rerouting for the user ID (=x), and transmits the search result to the mobile terminal 2 of the same user ID (=x) (step ST35). The rerouting in this case is a multimodal route search process that is performed with the current position, of the on-vehicle terminal 3, included in the reroute request being a departure position.

When the determination result in step S32 is negative, the management apparatus 1 further determines whether or not the route information A of the user ID (=x) has a circumstantial change in the route on and after the current time point (step ST33).

The "circumstantial change" indicates a situation where a road is suddenly blocked or a scheduled service of public transportation is stopped due to severe traffic congestion, significant weather fluctuation, an event being held, etc.

When the determination result in step S33 is positive, the management apparatus 1 executes rerouting for the user ID (=x), and transmits the search result to the mobile terminal 2 of the same user ID (=x) (step ST35).

When the determination result in step S33 is negative, the management apparatus 1 does not execute rerouting for the user ID (=x), and maintains the route information A of the user ID (=x) (step ST34).

[Reroute Determination Process for Each Public ID By Management Apparatus]

FIG. 6 is a flowchart showing an example of a reroute determination process for each public ID by the management apparatus 1.

Although the "management apparatus 1" is described as an operation subject below, the operation subject that actually executes the process is the control unit 13 of the management apparatus 1.

As shown in FIG. 6, the management apparatus 1 determines whether or not a plurality of user IDs (=xi (i=1, 2, . . . )) are associated with one public ID (assumed to be train ID=d3 shown in FIG. 2) (step ST41).

The plurality of user IDs (=xi) corresponding to the one train ID (=d3) mean that a plurality of users, who are traveling a multimodal route including the public route of the train ID (=d3), are on the corresponding train.

When the determination result is negative, the management apparatus 1 ends the process. When the determination result is positive, the management apparatus 1 executes a public route monitoring process (step ST42).

As described above, the "monitoring process" is a process of calculating and evaluating a divergence between a scheduled passing point and corresponding scheduled passing time (schedule value) and an actual passing point and passing time (actual value), on the basis of the passage schedule included in the route information A.

However, as for a public route using public transportation, since a stationary operation schedule has been established, a divergence between the schedule value and the actual value can be evaluated by determining whether or not the operation schedule at current time is stationary.

Therefore, in the public route monitoring process, the management apparatus 1 inquires of the operation management server 6 about the state of the operation schedule, of the train ID (=d3), corresponding to the route a3, and determines whether or not change in the operation state is great (step ST43).

In the present embodiment, in a case where a delay in the operation schedule of the train ID (=d3) is not smaller than a predetermined time (e.g., 15 minutes) because of, for example, occurrence of an accident, the management apparatus 1 determines that change in the operation state is great.

When the determination result is positive, the management apparatus 1 executes rerouting for the plurality of user IDs (=xi) corresponding to the train ID (=d3), and transmits the search result to the mobile terminals 2 of the respective user IDs (=xi) (step ST44).

In this case, the management apparatus 1 performs rerouting that causes the users to get off the train at a nearest station when the above determination is made, and transfer to another traveling means including a train in another route. For example, taxis can be dispatched to the nearest station. In a case where occurrence of traffic congestion is predicted because there are many target users and taxis for them rush to the station, the management apparatus 1 can make an instruction of traffic signal control to reduce the traffic congestion.

Even when the determination result is positive, if the management apparatus 1 has determined that a user will arrive at the destination by the scheduled time, the management apparatus 1 need not execute rerouting. This determination is performed for each user ID. Among the users who have boarded the same train, a user having time to spare in the route subsequent to the train may not need rerouting.

When the determination result is negative, the management apparatus 1 does not execute rerouting for the plurality of user IDs (=xi) corresponding to the train ID (=d3), and maintains the current route information of the user IDs (=xi) (step ST45).

[Image Diagram of Route Information]

FIG. 7 is an image diagram showing routes a1 to a5 included in route information A.

The route information A is an example of a multimodal route calculated by the management apparatus 1, in which, for example, a user's home is a departure place and an airport in another prefecture is a destination. The route information A shown in FIG. 7 is the same as the route information A shown in FIG. 2, and includes five routes a1 to a5 in order from the departure place.

Specifically, the route a1 is a pedestrian route, the route a2 is a non-public route using a taxi, and the route a3 is a public route using a train.

The route a4 is a non-public route using a shared taxi, and the route a5 is a public route using an airplane. An end point of the route a5 is an airport that is the destination.

FIG. 8 is an image diagram showing routes b1 to b5 included in another route information B.

The route information B is an example of a multimodal route calculated by the management apparatus 1, in which a client's company, being a location for a business trip, is a departure place and a user's home in another prefecture is a destination. The route information B shown in FIG. 8 includes five routes b1 to b5 in order from the departure place.

Specifically, the route b1 is a pedestrian route, the route b2 is a public route using a bus, and the route a3 is a public route using a train.

The route b4 is a non-public route using a shared taxi, and the route b5 is a pedestrian route.

In the route information B shown in FIG. 8, since a significant delay has occurred in the operation of the train in the route b3 as described above, the management apparatus 1 executes rerouting for a plurality of user IDs who have boarded the train of the train ID.

Therefore, the route b4 and the route b5 subsequent to the route b3 correspond to a multimodal route calculated through rerouting by the management apparatus 1.

As described above, the management apparatus 1 according to the present embodiment is able to execute traffic-actuated control for the traffic signal units provided at the intersections that belong to the management area thereof.

Therefore, it is preferable to execute a traffic signal control using, for example, a signal control parameter that allows the shared taxi used in the route b4 to be highly likely to pass the intersections in the route b4 with green light. Thus, it is possible to make up for the delay that occurred in the route b3 using the train, as much as possible.

[Effects of Present Embodiment]

According to the route search system of the present embodiment, the control unit 13 of the management apparatus (route search apparatus) 1 causes the passage schedules of the routes a1 to a5, and the identification information (=traffic IDs), of the traveling means used for traveling along the routes a1 to a5, which is associated with the user ID, to be included in the data content of the multimodal route (see FIG. 2).

Therefore, a local terminal such as a mobile terminal 2 can be caused to execute the monitoring process as to whether or not the user is traveling the routes a1 to a5 as scheduled, whereby processing load for the multimodal route monitoring process can be appropriately dispersed.

For example, in the route search system of the present embodiment, a mobile terminal 2 monitors whether or not the mobile terminal 2 is traveling the pedestrian route a1 as scheduled, on the basis of the passage schedule of the pedestrian route a1 (steps ST12, ST13 in FIG. 3). When the monitoring result is negative, the mobile terminal 2 transmits, to the management apparatus 1, a reroute request that causes the management apparatus 1 to re-execute the search process (step ST14 in FIG. 3).

Therefore, even when the user could not travel the pedestrian route a1 as scheduled, the mobile terminal 2 can receive an alternative multimodal route newly generated by the management apparatus 1, whereby the user is provided with effective route information for the future.

In the route search system of the present embodiment, the on-vehicle terminal 3 monitors whether or not the own vehicle is traveling the non-public route a2 (a4) as scheduled, on the basis of the passage schedule of the non-public route (steps ST23, ST24 in FIG. 4). When the monitoring result is negative, the on-vehicle terminal 3 transmits, to the management apparatus 1, a reroute request that causes the management apparatus 1 to re-execute the search process.

Therefore, even when the user could not travel the non-public route a2 (a4) as scheduled, the on-vehicle terminal 3 can receive an alternative multimodal route newly generated by the management apparatus 1, whereby the user is provided with effective route information for the future.

In the route search system of the present embodiment, the control unit 13 of the management apparatus 1 monitors whether or not the public transportation is traveling the public route a3 (a5) as scheduled, on the basis of the passage schedule of the public route a3 (a5) (ST42, ST43 in FIG. 6). When the monitoring result is negative, the control unit 13 re-executes the search process for all the user IDs corresponding to the traffic ID of the public transportation (ST44 in FIG. 6).

Therefore, rerouting for the mobile terminals 2 of the plurality of user IDs can be executed based on the monitoring result of one public route.

Accordingly, processing load of the whole system can be reduced as compared with a case where each of the mobile terminals 2 of the plurality of user IDs using the same public route executes the public route monitoring process.

According to the route search system of the present embodiment, the management apparatus 1 searches for a multimodal route in response to a search request from a mobile terminal 2, and the mobile terminal 2, upon receiving the search result, displays the multimodal route for the user.

Therefore, the user can travel to the destination along a route most suited to his/her needs while making the most of the multimodal route.

According to the route search system of the present embodiment, when a route change is required for the user's convenience or the operation state of public transportation is changed, a new multimodal route is generated through rerouting by the management apparatus 1, and the user is provided with the generated multimodal route. Therefore, the user can flexibly cope with the circumstantial change during traveling.

According to the route search system of the present embodiment, the management apparatus 1 aggregates multimodal routes generated for a large number of users, thereby optimizing transportation resources, and optimizing energy consumption in society.

When tracing (monitoring) of a multimodal route is entrusted to local electronic equipment, processing load of the management apparatus 1 can be reduced.

In particular, when the users use public transportation, the management apparatus 1 may collectively manage the user IDs using the public transportation, and trace the operation state of the public transportation. Thus, reduction in processing amount of the management apparatus 1 and reduction in information communication resources can be achieved.

[First Modification]

In the above embodiment, identification information of a mobile terminal 2 (hereinafter referred to as "mobile ID") is used as a user ID, so that the user ID and the mobile ID are not discriminated from each other. However, the management apparatus 1 may manage both a unique user ID and a mobile ID associated with the user ID.

Specifically, the management apparatus 1 may associate a unique user ID (=xi (i=1, 2, . . . )), which has been specified by being entered in the website of the management apparatus 1 by the user, with a unique mobile ID (=yj (j=1, 2, . . . )) determined at the time of the entry, and may manage these IDs.

In this case, when receiving a search request including a mobile ID=y1, the management apparatus 1 may regard that this search request is from the user ID=x1 corresponding to the mobile ID=y1, and may execute a multimodal route search process for the user of the user ID=x1.

Further, in a pedestrian route, only the mobile terminal 2 of the mobile ID (=y1) travels with the user of the user ID (=x1). Therefore, the management apparatus 1 may regard the mobile terminal 2 as traveling means in the pedestrian route a1, and may incorporate the mobile ID (=y1) in the traffic ID.

In the above embodiment in which a mobile ID is used as a user ID, the subjects of the monitoring processes for the routes a1 to a5 are as follows.

1) The monitoring processes for the public routes a3 and a5 are performed by the management apparatus 1.

2) The monitoring processes for the routes a1, a2, and a4 other than the public routes a3 and a5 are performed by the mobile terminal 2 of the user ID (=x1) or by the on-vehicle terminal 3 of the traffic ID (taxi ID (=t2) or taxi ID (=t4)) associated with the user ID (=x1).

In the present modification in which a mobile ID is defined in association with a user ID, the subjects of the route monitoring processes are as follows.

1) The monitoring processes for the public routes a3 and a5 are performed by the management apparatus 1.

2) The monitoring processes for the routes a1, a2, and a4 other than the public routes a3 and a5 are performed by the mobile terminal 2 or the on-vehicle terminal 3 having the traffic ID (mobile ID (=y1), taxi ID (=t2), or taxi ID (=t4)) associated with the user ID (=x1).

As described above, in any case, the monitoring processes for the public routes a3 and a5 are executed by the management apparatus 1 while the monitoring processes for the routes a1, a2, and a4 are executed by local terminals such as the mobile terminal 2 and the on-vehicle terminal 3 which are traveling means defined by the traffic IDs of the routes a1, a2, and a4.

Upon receiving a reroute request from any of the above local terminals, the management apparatus 1 executes rerouting for the user ID included in the reroute request, or for the user ID corresponding to the traffic ID (mobile ID (=y1), taxi ID (=t2), or taxi ID (=t4)) included in the reroute request.

[Second Modification]

In the above embodiment (including the first modification), when an on-vehicle terminal 3 has traveled a route assigned thereto, as scheduled, the on-vehicle terminal 3 may transmit a route completion notification to the management apparatus 1.

In this case, if there is neither a reroute request nor a route completion notification from an on-vehicle terminal 3 of a predetermined traffic ID even when an end-point passing time of a route assigned to the traffic ID has passed, the management apparatus 1 preferably transmits, to a mobile terminal 2, a confirmation request as to whether or not the on-vehicle terminal 3 has traveled the route as scheduled.

Upon receiving the confirmation request, the mobile terminal 2 may determine whether or not the mobile terminal 2 has traveled the route assigned to the on-vehicle terminal 3, as scheduled, on the basis of the current position of the mobile terminal 2 and the current time, and may transmit the determination result to the management apparatus 1.

Thus, even when the on-vehicle terminal 3 cannot communicate with the management apparatus 1 due to temporary communication failure or the like, the mobile terminal 2 can be caused to execute the monitoring process as to whether or not the user has traveled the non-public route as scheduled.

[Other Modifications]

The embodiment (including modifications) disclosed herein is illustrative in all aspects and should be considered not restrictive. The scope of the present invention is not limited by the configuration of the above-described embodiment but is defined by the claims, and is intended to include meaning equivalent to the scope of the claims and all modifications within the scope.

In the above embodiment, association of a passage schedule with identification information (=traffic ID) of traveling means may be performed not for all the routes a1 to a5 but for at least one of the routes a1 to a5.

In the above embodiment, the management apparatus 1 may aggregate OD information included in search requests from a large number of user IDs, and may use the aggregated OD information for traffic control such as traffic signal control.

In the above embodiment, the management apparatus 1 may predict a congestion state of predetermined public transportation by using OD information included in search requests from a large number of user IDs. Furthermore, the management apparatus 1 may provide the user with the congestion state when receiving a search request from the user.

For example, an "occupancy rate" is calculated based on the number of user IDs associated with the same train ID and on a predetermined number of passengers on the train, and the occupancy rate is displayed when a traveling route is displayed. With reference to the occupancy rate, the user may avoid a crowded train even if the arrival time to the destination is delayed, or may take a crowded train as scheduled if he/she desires to arrive at the destination by the scheduled time.

In the above embodiment, routes are classified into a pedestrian route, a public route, and a non-public route. The non-public route may be further classified into a plurality of types, and conditions such as priority and route calculation may be varied depending on the route type.

REFERENCE SIGNS LIST 1 management apparatus (route search apparatus)
2 mobile terminal
3 on-vehicle terminal 4 public communication network
5 reservation management server
6 operation management server
7 weather server
8 event server
9 traffic signal controller
11 communication unit
12 storage unit
13 control unit
21 wireless communication unit
22 position detection unit
23 display unit
24 operation unit
25 storage unit
26 control unit
31 wireless communication unit
32 position detection unit
33 display unit
34 operation unit
35 storage unit
36 control unit

The invention claimed is:

1. A route search system including a route search apparatus configured to communicate with a mobile terminal, the route search apparatus comprising:
a communication unit configured to receive, from the mobile terminal, a search request including identification information of a user; and
a control unit configured to execute a search process for a multimodal route that includes at least one route including a pedestrian route, a non-public route, and a public route, in accordance with the received search request, and cause the communication unit to transmit the multimodal route as a search result, wherein
the pedestrian route is a route in which the user travels on foot, the non-public route is a route in which the user travels by using a non-public vehicle, and the public route is a route in which the user travels by using public transportation,
the control unit causes a passage schedule of the at least one route and identification information identifying traveling means used for traveling along the at least one route to be included in a data content of the multimodal route obtained through the search process, the identification information identifying the traveling means associated with the identification information of the user and the passage schedule of the at least one route, the passage schedule of the at least one route including a start-point passing time point and an end-point passing time point for each route of the at least one route, and before causing the communication unit to transmit the multimodal route the identification information is caused to be included in the data content when a traveling means other than on foot is used for traveling along the route,
the communication unit is further configured to transmit the multimodal route as the search result to the mobile terminal of the user after the control unit causes the passage schedule of the at least one route and the identification information identifying the traveling means used for traveling along the at least one route to be included in the data content of the multimodal route obtained through the search process, the search result corresponding to the search request and including the passage schedule and the identification information identifying the traveling means, the identification information is caused to be included in the data content when a traveling means other than on foot is used for traveling along the route, and
the mobile terminal configured to execute monitoring whether the user is traveling each route as scheduled to disperse a processing load for multimodal route monitoring from the control unit configured to execute the search process.

2. The route search system according to claim 1, further comprising the mobile terminal, wherein the mobile terminal monitors whether or not the mobile terminal is traveling the pedestrian route as scheduled, on the basis of the passage schedule of the pedestrian route.

3. The route search system according to claim 2, wherein when a result of the monitoring is negative, the mobile terminal transmits, to the route search apparatus, a reroute request that causes the route search apparatus to re-execute the search process.

4. The route search system according to claim 1, further comprising an on-vehicle terminal mounted on the non-public vehicle, wherein
the on-vehicle terminal has previously been notified of a passage schedule of the non-public route in which the non-public vehicle passes, and identification information of the non-public vehicle, and
the on-vehicle terminal monitors whether or not the non-public vehicle is traveling the non-public route as scheduled, on the basis of the passage schedule of the non-public route.

5. The route search system according to claim 4, wherein when a result of the monitoring is negative, the on-vehicle terminal transmits, to the route search apparatus, a reroute request that causes the route search apparatus to re-execute the search process.

6. The route search system according to claim 1, wherein the control unit monitors whether or not the public transportation is traveling the public route as scheduled, on the basis of the passage schedule of the public route.

7. The route search system according to claim 6, wherein when a result of the monitoring is negative, the control unit re-executes the search process with respect to identification information of all users corresponding to identification information of the public transportation.

8. The route search system according to claim 1, wherein the route search apparatus executes monitoring as to whether or not the user is traveling the public route as scheduled, and
the mobile terminal or an on-vehicle terminal of the non-public vehicle executes monitoring as to whether or not the user is traveling the routes other than the public route as scheduled.

9. The route search system according to claim 8, wherein when the communication unit has received a reroute request from the mobile terminal or the on-vehicle terminal, the control unit executes rerouting that is a process of re-executing the search process with respect to the identification information of the user included in the reroute request or to the identification information of the user corresponding to the identification information of the traveling means.

10. The route search system according to claim 8, wherein in a case where there is no reroute request from the on-vehicle terminal and there is no completion notification regarding the non-public route from the on-vehicle terminal even when an end-point passing time of the non-public route has passed, the control unit transmits, to the mobile terminal, a confirmation request as to whether or not the on-vehicle terminal has traveled the non-public route as scheduled.

11. A route search apparatus configured to communicate with a mobile terminal, the route search apparatus comprising:
- a communication unit configured to receive, from the mobile terminal, a search request including identification information of a user; and
- a control unit configured to execute a search process for a multimodal route that includes at least one route including a pedestrian route, a non-public route, and a public route, in accordance with the received search request, and cause the communication unit to transmit the multimodal route as a search result, wherein the pedestrian route is a route in which the user travels on foot, the non-public route is a route in which the user travels by using a non-public vehicle, and the public route is a route in which the user travels by using public transportation, the control unit causes a passage schedule of the at least one route and identification information identifying traveling means used for traveling along the at least one route to be included in a data content of the multimodal route obtained through the search process, the identification information identifying the traveling means associated with the identification information of the user and the passage schedule of the at least one route, the passage schedule of the at least one route including a start-point passing time point and an end-point passing time point for each route of the at least one route, before causing the communication unit to transmit the multimodal route, the identification information is caused to be included in the data content when a traveling means other than on foot is used for traveling along the route, the communication unit is further configured to transmit the multimodal route as the search result to the mobile terminal of the user after the control unit causes the passage schedule of the at least one route and the identification information identifying the traveling means used for traveling along the at least one route to be included in the data content of the multimodal route obtained through the search process, the search result corresponding to the search request and including the passage schedule and the identification information identifying the traveling means, the identification information is caused to be included in the data content when a traveling means other than on foot is used for traveling along the route, and the mobile terminal configured to execute monitoring whether the user is traveling each route as scheduled to disperse a processing load for multimodal route monitoring from the control unit configured to execute the search process.

12. A route search method executed by a route search apparatus configured to communicate with a mobile terminal, the method comprising the steps of:
- receiving, from the mobile terminal, a search request including identification information of a user;
- executing a search process for a multimodal route that includes at least one route including a pedestrian route, a non-public route, and a public route, in accordance with the received search request, and transmitting the multimodal route as a search result to the mobile terminal of the user, wherein the pedestrian route is a route in which the user travels on foot, the non-public route is a route in which the user travels by using a non-public vehicle, and the public route is a route in which the user travels by using public transportation;
- causing a passage schedule of the at least one route and identification information identifying traveling means used for traveling along the at least one route to be included in a data content of the multimodal route obtained through the search process, the identification information identifying the traveling means associated with the identification information of the user and the passage schedule of the at least one route, the passage schedule of the at least one route including a start-point passing time point and an end-point passing time point for each route of the at least one route, before transmitting the multimodal route, the identification information is caused to be included in the data content when a traveling means other than on foot is used for traveling along the route; and
- transmitting the multimodal route as the search result to the mobile terminal of the user after causing the passage schedule of the at least one route and the identification information identifying the traveling means used for traveling along the at least one route to be included in the data content of the multimodal route obtained through the search process, the search result corresponding to the search request and including the passage schedule and the identification information identifying the traveling means, the identification information is caused to be included in the data content when a traveling means other than on foot is used for traveling along the route,
- wherein the mobile terminal is configured to execute monitoring whether the user is traveling each route as scheduled to disperse a processing load for multimodal route monitoring.

13. A non-transitory computer readable storage medium storing a computer program for causing a computer to function as a route search apparatus configured to communicate with a mobile terminal, the program causing the computer to function as:
- a communication unit configured to receive, from the mobile terminal, a search request including identification information of a user; and
- a control unit configured to execute a search process for a multimodal route that includes at least one route including a pedestrian route, a non-public route, and a public route, in accordance with the received search request, and cause the communication unit to transmit the multimodal route as a search result, wherein the pedestrian route is a route in which the user travels on foot, the non-public route is a route in which the user travels by using a non-public vehicle, and the public route is a route in which the user travels by using public transportation, the control unit causes a passage schedule of the at least one route and identification information identifying traveling means used for traveling along the at least one route to be included in a data content of the multimodal route obtained through the search process, the identification information identifying the traveling means associated with the identification information of the user and the passage schedule of the at least one route, the passage schedule of the at least one route including a start-point passing time point and an end-point passing time point for each route of the at least one route, before causing the communication unit to transmit the multimodal route, the identification information is caused to be included in the data content when a traveling means other than on foot is used for traveling along the route, the communication unit is further configured to transmit the multimodal route as the search result to the mobile terminal of the user after the control unit causes the passage schedule of the at least one route and the identification information identifying the traveling means used for traveling along the at least one route to be included in the data content of the multimodal route obtained through the search process, the search result corresponding to the search request and including the passage schedule and the identification information identifying the traveling means, the identification information is caused to be included in the data content when a traveling means other than on foot is used for traveling along the route, and the mobile terminal configured to execute monitoring whether the user is traveling each route as scheduled to disperse a processing load for multimodal route monitoring from the control unit configured to execute the search process.

* * * * *